United States Patent
Ennis

(10) Patent No.: US 8,051,521 B2
(45) Date of Patent: Nov. 8, 2011

(54) DOUBLE WRAP AROUND BRUSH SET CAR WASH APPARATUS

(76) Inventor: G. Thomas Ennis, Inglewood, CA (US)

( * ) Notice: Subject to any disclaimer, the term of this patent is extended or adjusted under 35 U.S.C. 154(b) by 743 days.

(21) Appl. No.: 12/219,651

(22) Filed: Jul. 25, 2008

(65) Prior Publication Data

US 2010/0017979 A1   Jan. 28, 2010

(51) Int. Cl.
*B60S 3/06* (2006.01)

(52) U.S. Cl. ...................................... 15/53.3; 15/DIG. 2

(58) Field of Classification Search .................... 15/53.2, 15/53.3, DIG. 2
See application file for complete search history.

(56) References Cited

U.S. PATENT DOCUMENTS

| | | | | |
|---|---|---|---|---|
| RE29,516 E | * | 1/1978 | Genaro | 15/97.3 |
| 4,288,255 A | * | 9/1981 | Burger | 134/6 |
| 4,299,003 A | * | 11/1981 | Ennis | 15/53.3 |
| 4,754,515 A | * | 7/1988 | Ennis et al. | 15/53.3 |
| 7,293,316 B2 | * | 11/2007 | Ennis | 15/53.3 |

* cited by examiner

*Primary Examiner* — Randall Chin
(74) *Attorney, Agent, or Firm* — Mattingly & Malur, P.C.

(57) ABSTRACT

A vehicle washing apparatus includes a frame extending over a path of a vehicle to be washed and having a front arch, a first arch, a second arch and a rear arch connected by side members. A first pair of wrap around rotary brushes is pivotally connected to the first arch and a second pair of wrap around rotary brushes are pivotally connected to the second arch. The second arch is at a higher height than the first arch and extends over a top of the first pair of wrap around brushes so that the length of the apparatus is shortened.

11 Claims, 5 Drawing Sheets

DOUBLE WRAP AROUND BRUSH SET CAR WASH APPARATUS

BACKGROUND OF THE INVENTION

1. Field of the Invention

The present invention relates to an improved vehicle washing apparatus and, more particularly, to such an apparatus having a double wrap around brush set.

2. Description of the Related Art

Various prior art vehicle washing devices have heretofore been known employing wrap around rotary brush sets. Some such prior art devices include a single set of wrap around rotary brushes such as that shown in my U.S. Pat. No. 4,299,003 issued Jan. 23, 1973. Other such prior art devices employ a double wrap around brush set such as that shown in my U.S. Pat. No. 7,293,316 issued Nov. 13, 2007. Such prior art devices employing double sets of wrap around brushes increase the overall length of the device.

SUMMARY OF THE INVENTION

It is an object of the present invention to provide a vehicle washing apparatus having two sets of wrap around rotary brushes which has a shortened overall length.

Another object of the present invention is to provide a vehicle washing apparatus having two sets of wrap around rotary brushes which further includes a cleaning fluid dispenser mounted to the front of the device ahead of the brushes.

A further object of the invention is to provide a vehicle washing apparatus having two sets of wrap around brushes and which further includes a first scrubber curtain at the front of the device and a second scrubber curtain at the rear of the device as well as at least one rocker panel brush mounted on each side thereof.

The present invention achieves the above and other objects by providing a vehicle washing apparatus having a frame extending over a path of a vehicle to be washed, with the frame having a front arch, a first arch, a second arch and a rear arch connected by side members. A first pair of wrap around rotary brushes are pivotally connected to the first arch and positioned in said path to contact the vehicle and a second pair of wrap around rotary brushes are pivotally connected to the second arch and positioned in the path to contact the vehicle. The top of the second arch is at a higher height than the top of the first arch and extends over the top of the first pair of wrap around rotary brushes whereby the overall length of the apparatus is shortened and is more compact.

The device further may include a cleaning fluid dispenser mounted to the front arch and positioned over the path of the vehicle, a first scrubber curtain mounted to the front arch and positioned overhead in the path to contact the vehicle and a second scrubber curtain mounted to the rear arch and positioned overhead in the path to contact the vehicle. The first scrubber curtain is movable forwardly and backwardly with respect to the path while the second scrubber curtain is movable from side to side with respect to the path. The apparatus also may include at least one rocker panel rotary brush mounted on each side of the path to contact the sides and rocker panels of a vehicle.

These, together with other objects and advantages, which will be subsequently apparent, reside in the details of construction and operation as more fully described and claimed hereafter, reference being made to the accompanying drawings forming a part hereof, wherein like numerals refer to the like parts throughout.

DETAIL DESCRIPTION OF THE PREFERRED EMBODIMENTS

Figure 1:
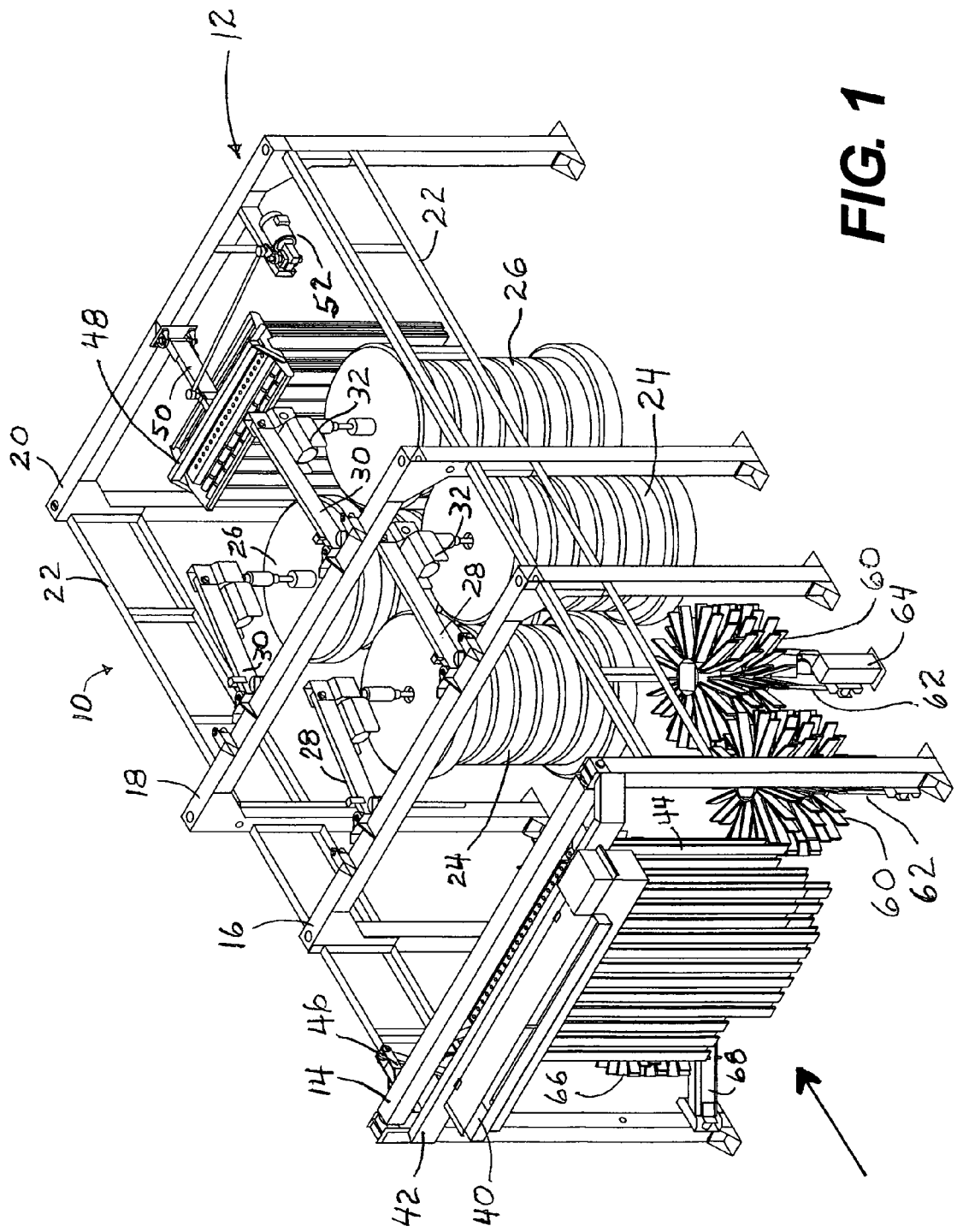
FIG. 1 is a perspective view of a vehicle washing apparatus according to the present invention.
Figure 2:
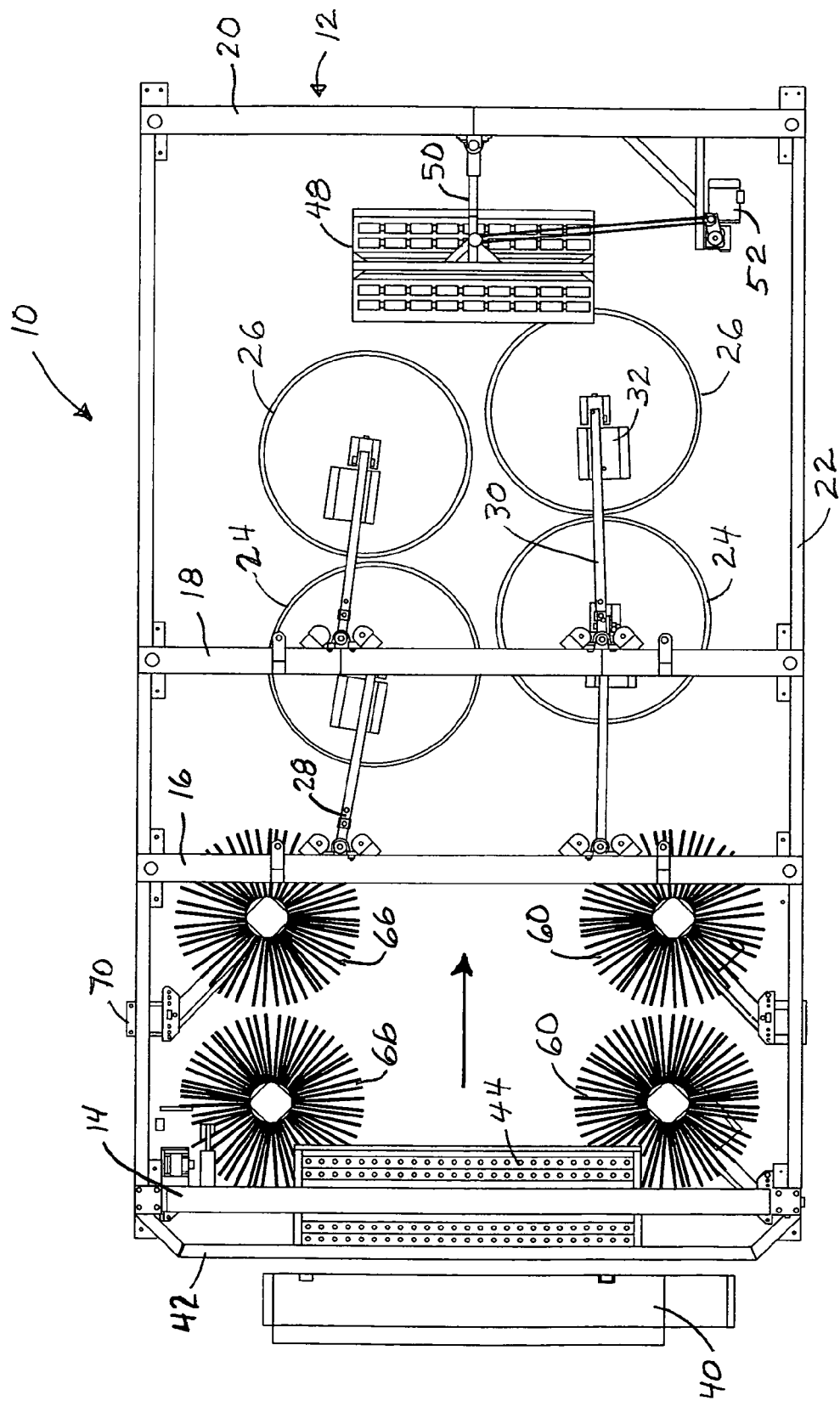
FIG. 2 is a top plan view of the vehicle washing apparatus shown in FIG. 1.

Referring to the drawings, a vehicle washing apparatus, generally referred to by the numeral 10, is shown which includes a supporting frame 12 extending over the path or position of the vehicle to be washed. The frame includes a front arch 14 positioned at the front of the frame, a first arch 16 spaced rearwardly therefrom, a second arch 18 spaced rearwardly from the first arch and a rear arch 20 at the back or rear of the frame. The arches are connected together by side members 22 extending the length of the apparatus on each side thereof.

A first pair of wrap around rotary brushes 24 are rotatably connected to the outer ends of a first pair of arms 28 pivotally connected to the top of the first arch 16 at a point overhead inside the path of the vehicle to be washed. A second pair of wrap around rotary brushes 26 are rotatably connected to a pair of second arms 30 at the outer end thereof with the arms 30 being pivotally connected at their inner ends to a top of the second arch 18 at a point overhead inside of the path of the vehicle to be washed. Each of the arms 28 and 30 have a motor 32 mounted thereto for rotating the brushes 24 and 26. Each of the rotating brushes 24, 26 is rotated in a direction which causes the brush the move itself around the vehicle due to the reaction force of the rotating brush against the vehicle.

The second arch 18 has a higher height than the first arch 16 so that it extends above and over the first arms 28 and the first wrap around brushes 24. With this construction, the second arch 18 is positioned closer to the first arch 16 whereby the second set of brushes 26 are positioned closer and more forwardly to the first set of brushes 24. This enables a shortening of the overall length of the vehicle washing apparatus.

A cleaning fluid dispenser 40 is mounted to a elongated arm or bracket 42 extending out from the front of the first arch 14 at the top thereof. The cleaning fluid dispenser may be of the type which distributes cleaning fluid in a bubble form across the width of a vehicle as it passes thereunder.

Figure 3:
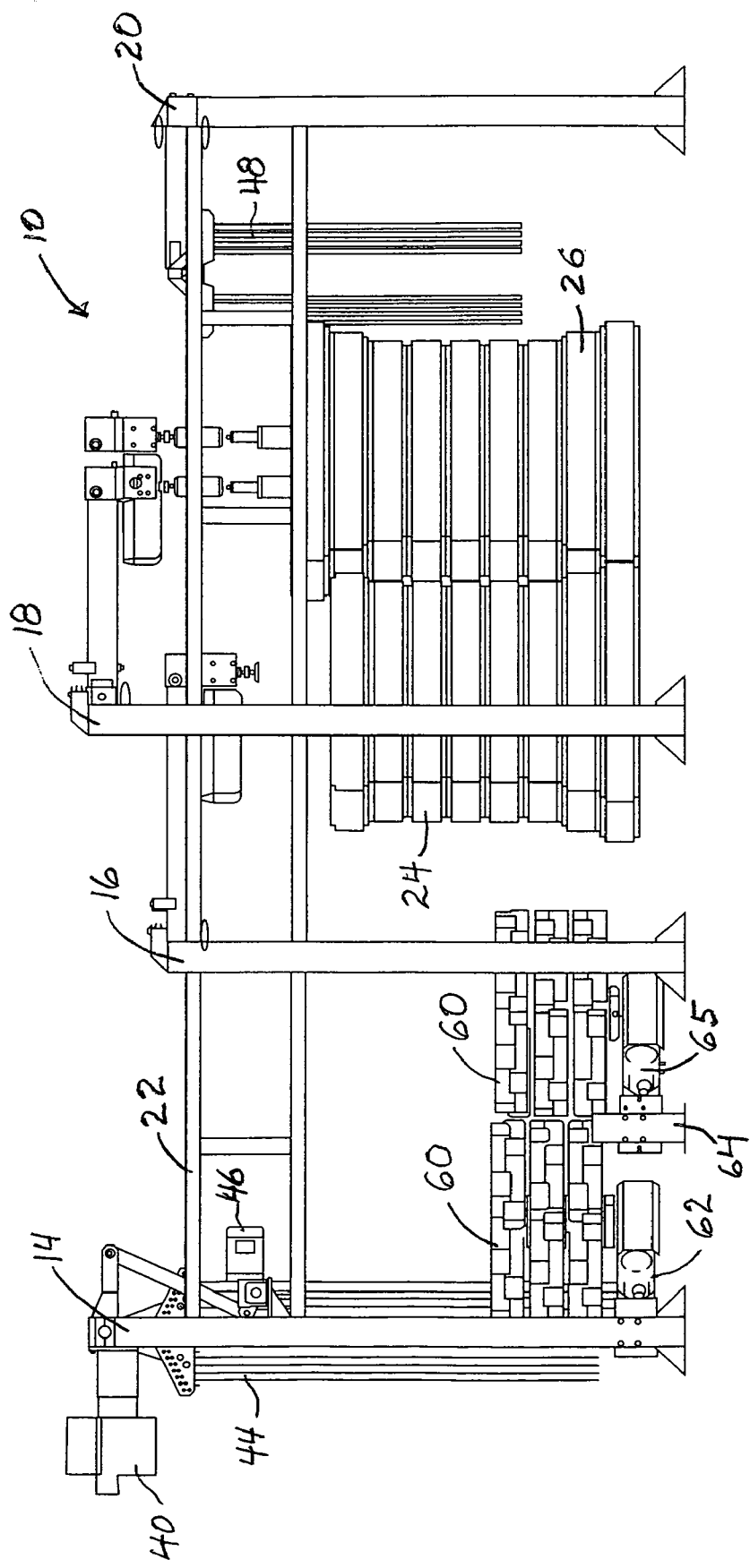
FIG. 3 is a side elevational view of the vehicle washing apparatus shown in FIG. 1.
Figure 4:
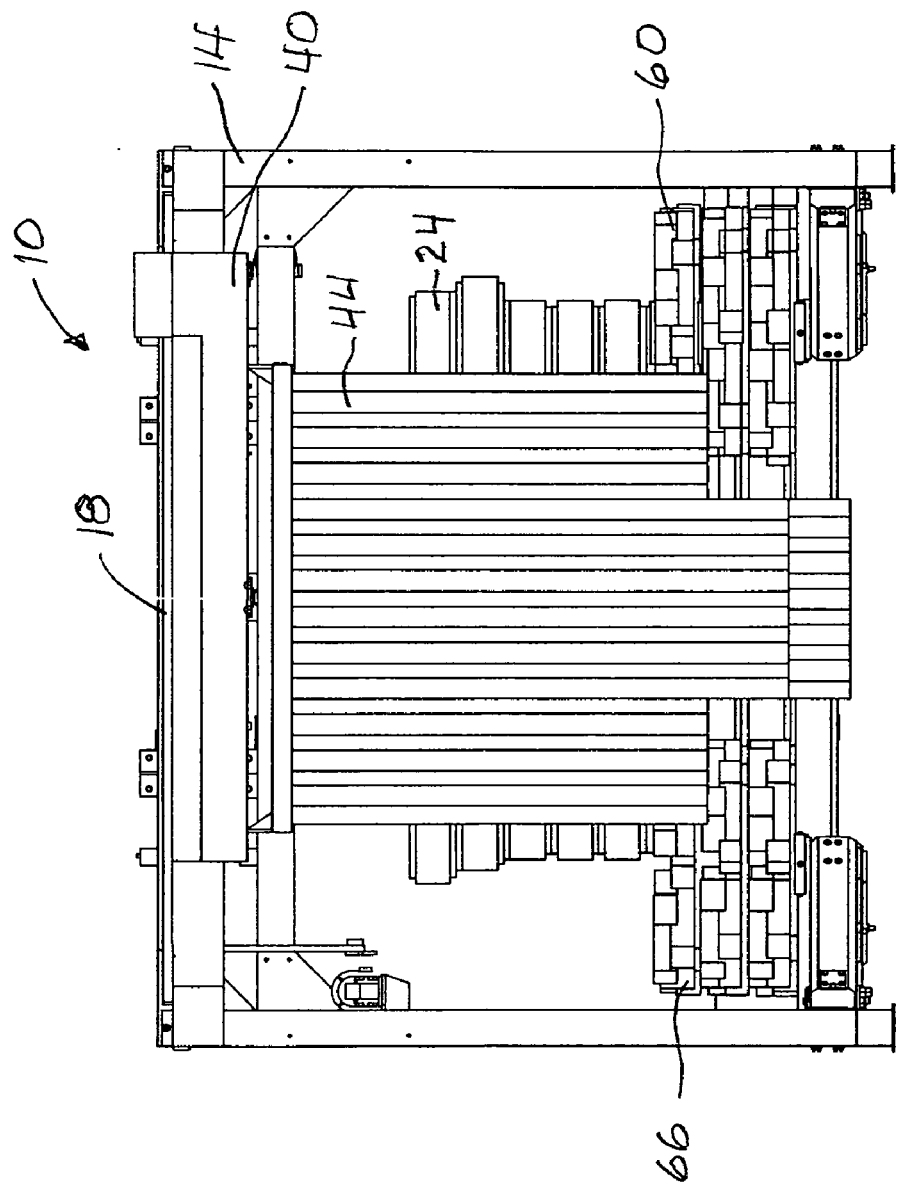
FIG. 4 is a rear elevational view of the washing apparatus shown in FIG. 1.
Figure 5:
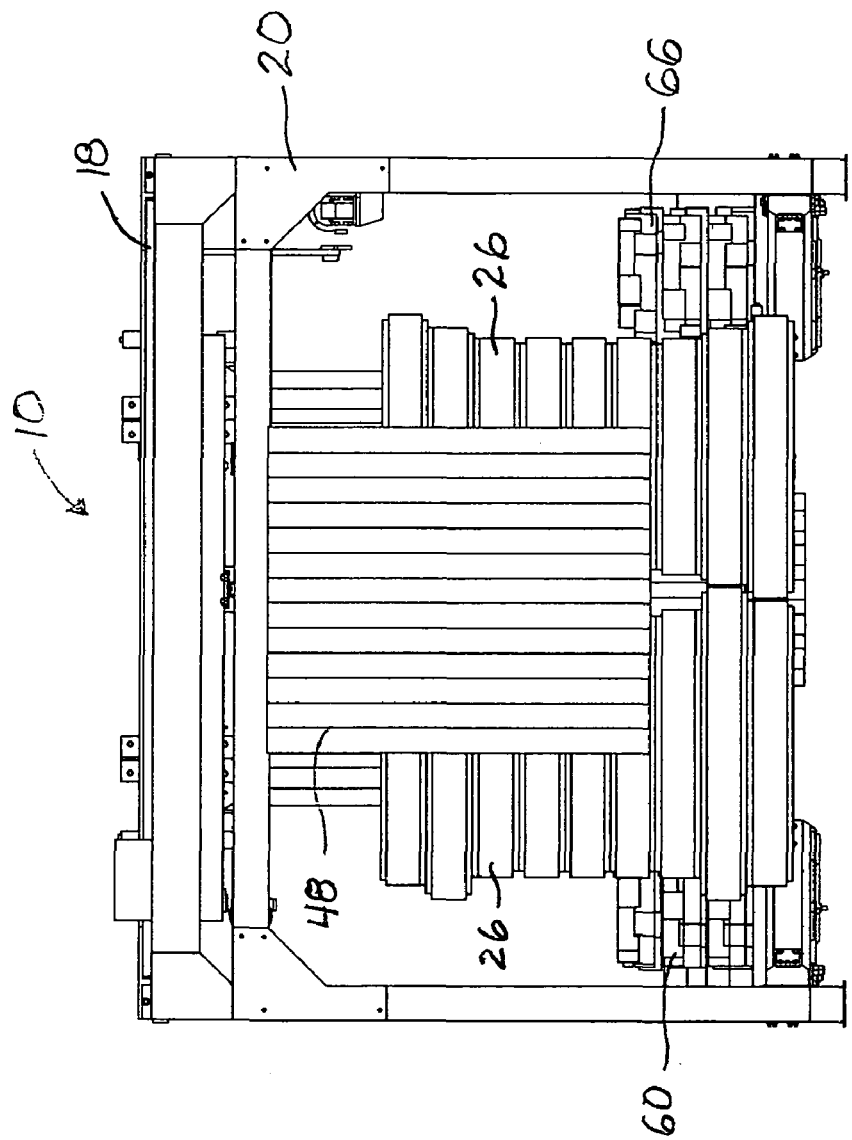
FIG. 5 is a front elevational of the vehicle washing apparatus shown in FIG. 1.

A first scrubber curtain 44 is pivotally mounted to the underside of the top of the front arch 14. The first scrubber curtain 44 preferably is constructed of a plurality of cleaning strips which extend downwardly from the top of the scrubber curtain unit. Suitable motor means 46 are provided for reciprocating the first scrubber curtain forwardly and backwardly as shown in FIG. 3.

A second scrubber curtain 48 is pivotally attached by an arm 50 to the top of the rear arch 20. The second scrubber curtain is also preferably constructed of a plurality of cleaning strips hanging downwardly therefrom. The second scrubber is mounted for movement from side to side. The side to side movement of the second scrubber unit is effected by suitable motor means 52.

A first set of rotary rocker panel brushes 60 are provided on the right hand side of the frame 12 for washing the sides and rocker panels of a vehicle. The first rocker panel brush is mounted adjacent the bottom of the vertical post of the front arch 14 by an arm 62 pivotally connected thereto. The second rotary rocker panel brush on the right hand side is pivotally mounted to a separate post 64 mounted to a surface between the side post of the front arch 14 and the first arch 16. The brushes 60 are rotated by suitable motor means 65 as shown in FIG. 3.

A second set of rotary rocker panel brushes are mounted adjacent to the bottom of the left hand side of the frame 12 adjacent to the front thereof. The first rocker panel brush 66 is mounted by an arm 68 pivotally mounted to a vertical post of the front arch 14 adjacent to the bottom thereof. The second rotary brush 66 is pivotally mounted to a separate post 70 mounted to a supporting surface between a vertical post of the front arch 14 and the first arch 16. The second rocker panel brushes 66 are rotated by suitable motor means 65.

The construction of the present invention affords several advantages. By having the second arch with a top which is higher than the top of the first arch, the second arch can be moved forwardly closer to the first arch so that the top of the second arch extends over the top of the first set of wrap around rotary brushes 24. This permits the overall length apparatus to be shortened. The apparatus further provides convenient frame connections for, the cleaning fluid dispenser 40 and the first scrubber curtain 44 at the front of the apparatus and convenient means for mounting the second scrubber 48 at the rear of the apparatus. Moreover, a pair of rocker panel brushes may be mounted on each side of the apparatus adjacent to front thereof.

Numerous other modifications and adaptations of the present invention will be apparent to those skilled in the art and thus, it is intended by the following claims to cover all such modification and adaptations which fall within the true spirit and scope of the invention.

What is claimed is:

1. A vehicle washing apparatus comprising:
   a frame extending over a path of a vehicle to be washed, said frame having a front arch, a first arch, a second arch and a rear arch connected by side members;
   a first pair of rotary brushes pivotally connected to said first arch and positioned in said path to contact the vehicle; and
   a second pair of rotary brushes pivotally connected to said second arch and positioned in said path to contact the vehicle; and wherein said second arch is at a higher height than said first arch and extends over a top of said first pair of rotary brushes.

2. A vehicle washing apparatus according to claim 1 which further comprises a cleaning fluid dispenser mounted to said front arch and positioned overhead in said path.

3. A vehicle washing apparatus according to claim 1 which further comprises a first scrubber curtain mounted to said front arch and positioned overhead in said path to contact the vehicle.

4. A vehicle washing apparatus according to claim 3 wherein said first scrubber curtain is movable forwardly and backwardly with respect to said path.

5. A vehicle washing apparatus according to claim 1 which further comprises a second scrubber curtain mounted to said rear arch and positioned overhead in said path to contact the vehicle.

6. A vehicle washing apparatus according to claim 5 wherein said second scrubber curtain is movable from side to side with respect to said path.

7. A vehicle washing apparatus according to claim 1 which further comprises at least one rocker panel brush mounted on each side of said path to contact the vehicle.

8. A vehicle washing apparatus comprising:
   a frame extending over a path of a vehicle to be washed, said frame having a front arch, a first arch, a second arch and a back arch connected by side members;
   a first pair of rotary brushes pivotally connected to said first arch and positioned in said path to be contacted by the vehicle;
   a second pair of rotary brushes pivotally connected to said second arch and positioned in said path to be contacted by the vehicle;
   said second arch being at a higher height than said first arch and extending over a top of said first pair of rotary brushes;
   a cleaning fluid dispenser mounted to said front arch and positioned overhead in said path;
   a first scrubber curtain mounted to said front arch and positioned overhead in said path to contact the vehicle; and
   a second scrubber curtain mounted to said back arch and positioned overhead in said path to contact the vehicle.

9. A vehicle washing apparatus according to claim 8 wherein said first scrubber curtain is movable forwardly and backwardly with respect to said path.

10. A vehicle washing apparatus according to claim 8 wherein said second scrubber curtain is movable from side to side with respect to said path.

11. A vehicle washing apparatus according to claim 8 which further comprises at least one rocker panel brush mounted on each side of said path to contact the vehicle.

\* \* \* \* \*